Aug. 13, 1968   A. M. VOSS   3,396,495

METHOD OF CLEANING A MOLDED PLASTIC ARTICLE

Filed Jan. 13, 1966

INVENTOR
A. M. VOSS

BY

ATTORNEY

United States Patent Office 3,396,495
Patented Aug. 13, 1968

3,396,495
METHOD OF CLEANING A MOLDED PLASTIC ARTICLE
Allen M. Voss, Lisle, Ill., assignor to Western Electric Company, Incorporated, New York, N.Y., a corporation of New York
Filed Jan. 13, 1966, Ser. No. 520,502
1 Claim. (Cl. 51—320)

ABSTRACT OF THE DISCLOSURE

Flash is removed from a molded article made from a plastic not dissolvable with a selected solvent, by initially directing a stream of flash-removing particles of a type dissolvable in the selected solvent at the area of the article having flash thereon so as to remove the flash. The article is thereafter treated with the solvent which at least partially dissolves and thereby dislodges any flash-removing particles which may have become retained in particle confining areas of the article.

---

This invention relates to a method of cleaning a molded plastic article and, more particularly, to a method of removing flash from a molded plastic article. It is an object of this invention to provide an improved method of such character.

A plastic article is generally manufactured by introducing a plastic molding material into a mold cavity which defines the shape of the article. The mold cavity is defined by a plurality of mold members which, in a mold defining relationship, engage one another along what are generally known as parting faces of the mold members. As is well known in the art, because of the high pressure involved in most molding operations, a certain amount of seepage of plastic material occurs from the mold cavity along the parting faces of the mold defining members when the plastic material is injected into the mold cavity. This resulting seepage produces, on the molded article, thin projections of plastic commonly called flash.

In molding an article which has a complex surface configuration, and particularly those having a number of openings and/or recesses therein, both the formation of flash on the article and the subsequent removal of the flash to produce an acceptable article becomes an acute problem. In molding such an article the increase of flash results from the fact that a greater number of more complicated mold members are necessary to define the mold cavity and, thus, there is a resultant increase in the number of parting faces along which the plastic can seep.

Before a molded article having such openings and/or recesses therein may be utilized in many applications, any flash thereon must be removed. It has been standard practice in the art to direct a stream of abrasive or flash-removing particles, such as granulated walnut shells or glass beads, at the area of the article having the flash thereon at a sufficient velocity to allow the particles to rupture the flash, and thereby to remove the flash from the article.

Since the abrasive particles are directed at the article at a velocity sufficient to remove the flash, there is a tendency for some of the particles to become wedged, lodged or otherwise retained in the openings and/or recesses of the article. Thus, after the flash-removing particles have been directed against the article it has been standard practice in the art to have the article examined by an operator to detect any particles which are retained in the openings and/or recesses of the article. Any detected particles are removed from the article by a hand operation wherein a pick is employed to forcefully remove the particles from their retained position in the openings and/or the recesses of the article. This hand operation is, of course, costly and in many cases the operator fails to remove all the particles lodged in the article.

Accordingly, it is another object of this invention to provide a method of removing flash from a molded plastic article which eliminates the necessity of utilizing an operator to detect and manually remove particles retained in openings and/or recesses of the article after treatment of the article with flash-removing particles.

It is still another object of this invention to provide a method of removing flash from a molded plastic article which insures the total removal of all flash-removing particles which are retained in openings and/or recesses of the article during a flash-removing operation.

It is a further object of this invention to provide a method of removing flash from a molded plastic article, which method is simple and effective in operation and economical to utilize.

In accordance with one preferred method of this invention, flash is removed from a molded plastic article by initially directing a stream of at least partially dissolvable, flash-removing particles at the area of the article having flash thereon to remove the same. The article is then treated with an agent which dissolves, at least partially, only flash-removing particles thereby to free or dislodge any of the flash-removing particles which may have become retained in particle-confining areas, such as openings and/or recesses of the article, whereby a finished article is produced which is free of flash and flash-removing particles.

This invention, together with further objects and advantages thereof, will best be understood by reference to the following description taken in connection with the accompanying drawings, in which.

Figure 1:
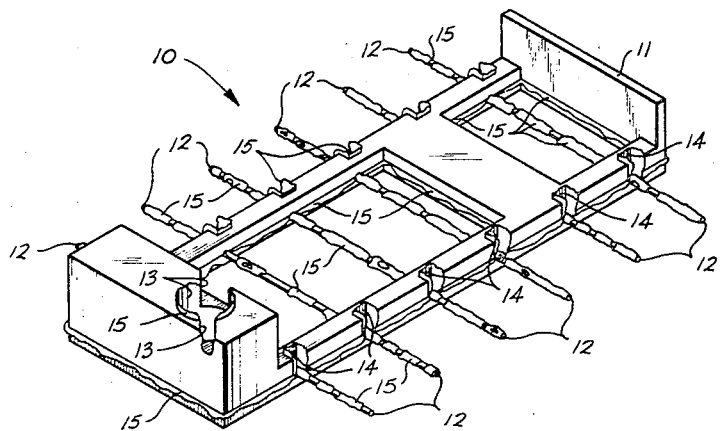
FIG. 1 is an isometric view of a newly molded plastic article which shows areas of flash extending from various surfaces of the article.

In FIG. 1 of the drawings there is illustrated a particular molded plastic article, generally designated by the numeral 10, which may have the flash removed therefrom by the method of this invention. It is to be understood, however, that the method of this invention may be employed to remove flash from a molded plastic article of any shape and design and, in fact, may be most advantageously employed in removing flash from a molded article which has a complex surface configuration as the result of having a number of openings and/or recesses in the surfaces thereof.

The article 10, shown in FIG. 1, consists of a plastic body portion 11 which is molded about, and thereby supports, a plurality of wires 12. The article also has a plurality of openings 13 and recesses 14 therein. In the article 10 described in conjunction with the preferred embodiment of the method of this invention, the plastic body portion 11 is molded from a black phenolic plastic, such as the type marketed by the Hooker Chemical Company, Inc., and identified as Durez 21028, and the wires 12 supported thereby are gold plated, nickel wires.

As is well known in the art, the plastic body portion 11 of the article 10 is formed by injecting the black phenolic plastic into a mold cavity defined by a plurality of mold members (not shown). The mold members, in order to define a mold cavity, are brought into engagement with one another along what are generally referred to as parting faces thereof. In the molding operation, a high pressure is employed to force the plastic into the mold cavity defined by the mold members. Because of this high pressure is employed to force the plastic into the expelled from the mold cavity along the opposed parting faces of adjacent mold members during the molding operation. Solidification of the expelled material, along with the solidification of the plastic material in the mold cavity, results in the production of a molded article which has thin projections of plastic, commonly called flash, integrally attached thereto. Because of the configuration of the mold members necessary to produce the article 10 shown in FIG. 1, areas of flash 15 are attached to the plastic body portion 11 of the article in those places pictorially illustrated in the figure.

Also, when the plastic body 11 is molded about the plurality of wires 12 at least an appreciable portion of each of the wires 12 are generally covered with a thin layer of plastic flash 15. This coverage of the wires with plastic flash results from the fact that it is almost physically impossible to produce mold-defining members which will clamp about the portions of the wires which are to project therefrom such that no spacing occurs therebetween. More particularly, such spaces between the wires and the mold members define additional cavities which are connected to the mold cavity defined by other portions of the mold members. Since these additional cavities are connected to the mold cavity, plastic is forced, during the molding operation, from the mold cavity into the additional cavities so as to surround, partially or totally, the wires and thereby produce a thin layer of flash about the wires when the plastic solidifies.

In order to produce an acceptable article of manufacture of the type disclosed in FIG. 1, the newly molded article 10 is treated so as to remove the flash 15 therefrom. As is well known in the art, flash may be removed from the article by directing a stream of abrasive or flash-removing particles at the article 10. The particles which strike the flash cause the thin layer initially formed thereby to deform sufficiently to rupture, and thereby become detached from the plastic body portion 11 of the article. With sufficient abrasive treatment, all of the flash 15 on the article 10 is removed therefrom such that both the openings 13 and the recesses 14 of the article, as well as the wires 12 projecting therefrom, are free of flash.

In past practice, the abrasive or flash-removing particles most commonly utilized for the flash-removing operation have been both granulated walnut and apricot shells and glass beads. However, the method of this invention utilizes flash-removing particles of a type which are not only sufficiently abrasive to remove the flash, but also of such a nature as to be dissolvable in an agent which will not dissolve the primary plastic material forming the body portion of the article.

In the preferred embodiment of the method of this invention, the flash-removing particles utilized for removing the flash from a newly molded article is a finely subdivided plastic. More particularly, the preferred plastic is an acrylic plastic such as Lucite Plastic Compound #29 or #47, known as NC–99, and marketed by the DuPont Company, Inc.

The acrylic plastic particles are sprayed on the article having flash which is to be removed therefrom by what may best be described as a spray gun apparatus. A spray gun is mounted in a closed cabinet having openings therein which allow the insertion of an operator's arms for the purpose of manipulating an article under the spray gun while the spray gun directs the flash-removing particles at selected areas of the article to remove the flash therefrom. Since the spray gun, cabinet and other necessary apparatus for particle spraying may take the form of a commercial unit, such as the Dry Honer, Model B, manufactured by the Vacu-Blast Company, Inc., of Belmont, Calif., no detailed description or drawings of the particle spraying unit are included herein.

In order to remove the flash 15 from the article 10 of FIG. 1, the article is sprayed with the aforementioned acrylic plastic particles in the aforementioned commercial spray unit. More particularly, the unit is loaded with acrylic plastic and air under 60 p.s.i. is fed to the unit for the purpose of entraining the plastic particles and directing them through the spray gun against the article held therebelow.

Figure 2:
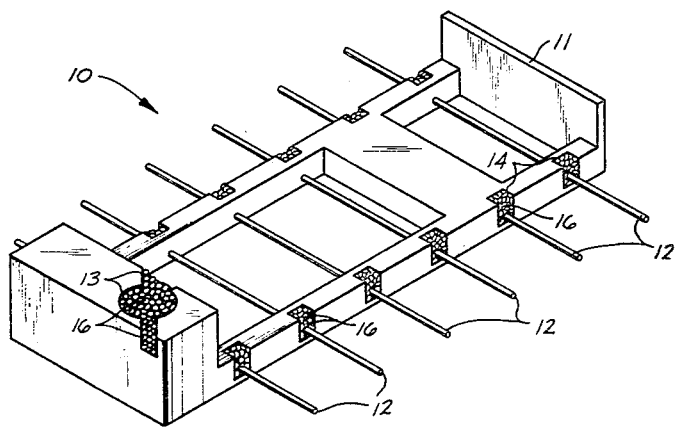
FIG. 2 is an isometric view of the molded article after a flash-removing operation has been performed thereon, which operation results in flash-removing particles being retained or embedded in openings and recesses of the article.

In FIG. 2, the article 10 is shown after the flash has been removed therefrom. The article 10 is now free from flash but small particles of the acrylic plastic 16 may be lodged, wedged or otherwise retained in both the openings 13 and the recesses 14 of the article. These retained flash-removing particles 16 must be removed in order to produce an acceptable article.

In the prior art processes, such retained particles were removed by means of a hand operation wherein a operator employed a pick or other suitable tool to physically engage a retained particle thereby to pry it loose from its retained position. This type of hand operation is both tedious and costly and, further, it does not insure the removal of all particles as the operator, particularly when on an assembly line, may often miss particles which are retained by the article. By the utilization of the method of this invention, however, the necessity of employing a hand operation to remove flash-removing particles retained by the article has been overcome and thus, this tedious and costly step in the process of removing the flash from a molded plastic body has been eliminated.

More specifically, in accordance with the principles and teachings of this invention, the article 10, having small plastic particles 16 retained in the openings 13 and recesses 14 thereof, is treated with an agent which selectively dissolves only the retained plastic particles and thereby produces a finished article free of flash and flash-removing particles.

Figure 3:
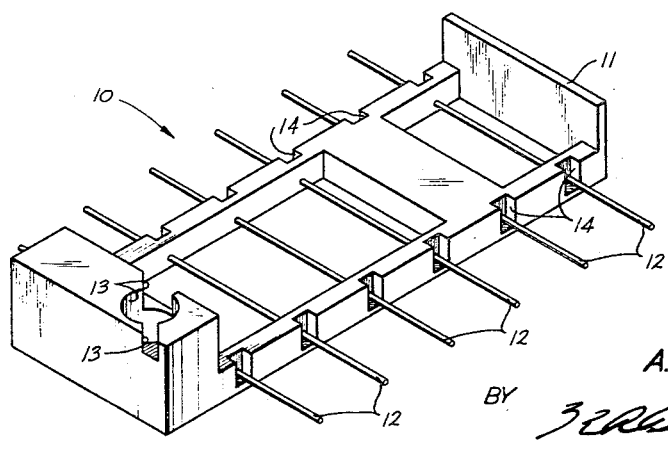
FIG. 3 is an isometric view of the molded article after both the flash and the flash-removing particles have been removed therefrom by the method of this invention.

When the article is made from black phenolic plastic and the flash-removing particles are acrylic plastic, as disclosed herein in the preferred embodiment of the method of this invention, the agent selected for dissolving the retained, acrylic plastic particles is trichloroethylene. More specifically, the article 10 is sprayed with trichloroethylene which has been heated to a temperature in the range of 140–170° F. The hot trichloroethylene is sprayed on the article for a period of approximately 5–60 seconds during which time the trichloroethylene is effective to dissolve only the acrylic plastic particles 16 retained in the openings 13 and recesses 14 of the articles 10. In other words, the hot trichloroethylene is effective to remove the particles 16 without damaging the plastic body portion 11 of the article 10 or the gold plated, nickel wires 12 projecting from the article. Thus, as shown in FIG. 3, there results from the application of the method of this invention to a flash-bearing, molded article, a finished article 10 which is free of flash and flash-removing particles.

It is of course obvious to one skilled in the art that the teachings of this invention are of wide application in that various combinations of a primary molding plastic, flash-removing particles, and agents for selectively dissolving only the flash-removing particles may be selected from the many types of materials available. It is only necessary for one to select a type of material for the flash-removing particles which is dissolvable in an agent which does not affect the primary plastic utilized in the molding of the article.

While an embodiment of the method of this invention has been disclosed herein, many modifications will be apparent, and it is intended that the invention be interpreted as including all modifications which fall within the true spirit and scope thereof.

What is claimed is:

1. A method of removing flash from a molded article made from a first type of plastic not dissolvable with a selected solvent, which method comprises the steps of:

spraying a second type of plastic in the form of a stream of flash-removing particles at the area of the article having flash thereon for a period of 5–60 seconds so as to remove the flash, said second type of plastic being acrylic plastic, and treating the article with a solvent comprising trichloroethylene heated to a temperature in the range of 140–170° F., said solvent at least partially dissolving the second type of plastic but having no dissolving effect on the first type of plastic, thereby dislodging any flash-removing particles which may have become retained in particle-confining areas of the article, and producing a finished article which is free of flash and flash-removing particles.

References Cited

UNITED STATES PATENTS

| | | | |
|---|---|---|---|
| 2,710,286 | 6/1955 | Zachariason | 51—320 X |
| 3,242,618 | 3/1966 | Kosar | 51—321 |
| 3,313,067 | 4/1967 | Smith et al. | 51—320 |

LESTER M. SWINGLE, *Primary Examiner.*

UNITED STATES PATENT OFFICE
CERTIFICATE OF CORRECTION

Patent No. 3,396,495                                                  August 13, 1968

Allen M. Voss

It is certified that error appears in the above identified patent and that said Letters Patent are hereby corrected as shown below:

Column 3, line 6, "is employed to force the plastic into the" should read -- a certain amount of the plastic is generally --. Column 4, line 50, "articles" should read -- article --.

Signed and sealed this 17th day of February 1970.

(SEAL)
Attest:

Edward M. Fletcher, Jr.                               WILLIAM E. SCHUYLER, JR.
Attesting Officer                                                Commissioner of Patents